(No Model.)
J. W. BALL.
PLOW SWEEP AND SHOVEL.
No. 490,798. Patented Jan. 31, 1893.
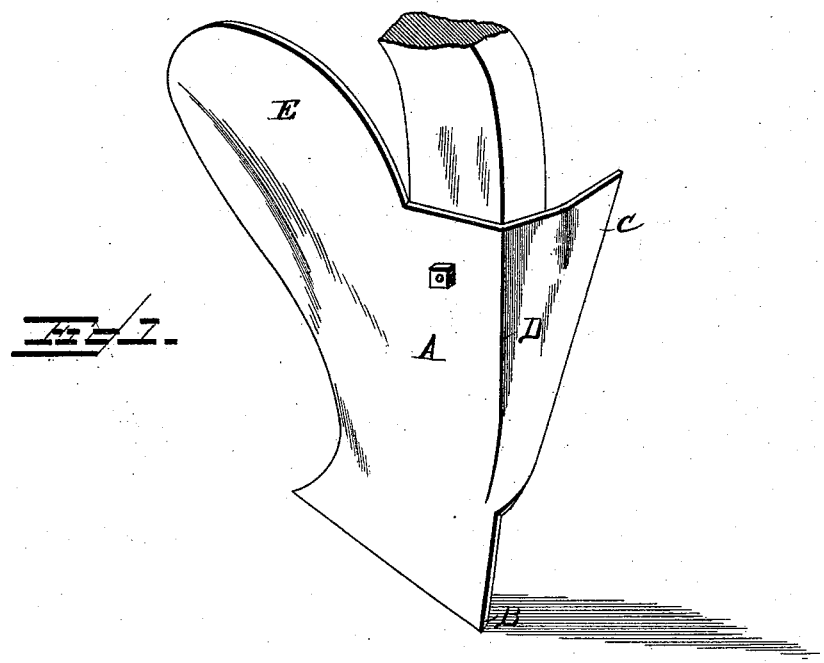
Witnesses
W. E. Schneider
Inventor
Jesse W. Ball.
By his Attorneys,
C. A. Snow & Co.

UNITED STATES PATENT OFFICE.

JESSE W. BALL, OF TYLER TOWN, MISSISSIPPI.

PLOW SWEEP AND SHOVEL.

SPECIFICATION forming part of Letters Patent No. 490,798, dated January 31, 1893.

Application filed August 31, 1892. Serial No. 444,655. (No model.)

*To all whom it may concern:*

Be it known that I, JESSE W. BALL, a citizen of the United States, residing at Tyler Town, in the county of Pike and State of Mississippi, have invented a new and useful Plow Sweep and Shovel, of which the following is a specification.

My invention relates to a combined plow sweep and shovel, united to form a single implement, the objects in view being simplicity, compactness, and strength of construction.

My invention is fully described hereinafter in connection with the drawings, and the novel features thereof are particularly pointed out in the appended claims.

In the drawings, Figure 1 is a perspective view of a plow shovel and sweep embodying my improvements; Fig. 2 is a transverse horizontal sectional view of the same.

A represents the shovel, the point, B, of which is in alignment with the front edge of the shovel, and C designates the sweep, which is subsantially triangular in shape and is formed integrally with the shovel in connection with its said front edge, the angle which is shown at D marking the line upon which the shovel and sweep are united.

Upon the opposite side of the shovel from the sweep is the wing, E, curved rearwardly toward its rear edge and bent forwardly at its upper end, said upper end rising above the upper edge of the shovel. The lower edge of the shovel is beveled as shown clearly in Fig. 1.

The sweep is inclined rearwardly toward its outer edge and is slightly convexed toward the front, said outer edge being inclined forwardly and downwardly and merging into the line of the front edge of the shovel.

The upper edge of the sweep is parallel and in the same plane with the upper edge of the shovel, as shown.

From the foregoing description it will be seen that my combined shovel and sweep is simple and therefore is capable of bearing strains which would cause fracture in plows having the shovel and sweep separate. Furthermore, no adjustment of the sweep is necessary when formed integral with the shovel, the advantage thereof being a saving in time as well as in expense.

Having thus described my invention what I claim and desire to secure by Letters Patent of the United States, is:—

1. A cultivator-shovel formed of a single piece of metal and having a main portion or wing A, having the point B formed at the lower end of its front edge, and a triangular sweep D, the upper edge of which is flush with the upper edge of the main portion, and the rear edge of which inclines forward toward its lower end and merges into the front edge of the main-portion above the point B, the adjacent portions of the main wing and sweep being arranged approximately at right angles to each other, substantially as specified.

2. In combination with a plow shovel, the triangular sweep, integral with the shovel and arranged at an angle to the plane thereof, the rear edge of said sweep merging into the front edge of the shovel above the lower end thereof and the upper edge of the sweep being flush with the upper edge of the shovel, substantially as specified.

In testimony that I claim the foregoing as my own I have hereto affixed my signature in the presence of two witnesses.

JESSE W. BALL.

Witnesses:
 W. L. DAVIS,
 W. H. CONERLY.